United States Patent
Unger (10) Patent No.: US 7,895,616 B2
(45) Date of Patent: Feb. 22, 2011

(54) RECONSTITUTION OF PROGRAM STREAMS SPLIT ACROSS MULTIPLE PACKET IDENTIFIERS

(75) Inventor: Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1873 days.

(21) Appl. No.: 10/084,106

(22) Filed: Feb. 27, 2002

(65) Prior Publication Data

US 2002/0194613 A1 Dec. 19, 2002

Related U.S. Application Data

(60) Provisional application No. 60/296,673, filed on Jun. 6, 2001, provisional application No. 60/304,241, filed on Jul. 10, 2001, provisional application No. 60/304,131, filed on Jul. 10, 2001, provisional application No. 60/343,710, filed on Oct. 26, 2001.

(51) Int. Cl.
*H04N 7/167* (2006.01)
(52) U.S. Cl. .............................. 725/31; 725/93; 725/91; 380/217
(58) Field of Classification Search ............. 725/91–94, 725/114–116, 134, 142, 144–146, 25–31; 386/68, 70, 94; 380/200, 201, 210, 217; 705/57–60

See application file for complete search history.

(56) References Cited

U.S. PATENT DOCUMENTS 3,852,519 A 12/1974 Court
4,374,399 A 2/1983 Ensinger (Continued)

FOREIGN PATENT DOCUMENTS

CA 2389247 5/2001

(Continued)

OTHER PUBLICATIONS

"A Report on Security Issues in Multimedia" by Gulwani, pp. 10-14, Apr. 30, 2000, Course Notes, Department of Computer Science and Engineering, Indian Institute of Technology Kanpur.

(Continued)

*Primary Examiner*—Annan Q Shang
(74) *Attorney, Agent, or Firm*—Miller Patent Services; Jerry A. Miller (57) ABSTRACT

A method and apparatus for reconstituting packetized data streams representing a television program when the program uses multiple packet identifiers (PID) as in selective encryption schemes. Transmission of multiple sets of system information (SI) is avoided by incorporating a lookup table within a private data packet. A dual buffer arrangement in the set-top box provides ease of reconstitution of a data stream by generation of an interrupt upon receipt of a packet with a shadow PID. The buffers are toggled as a result of the interrupt and a corresponding packet can be found either at the beginning of the newly active buffer or the end of the inactive buffer. The stream of packets representing a program can then be reconstituted by creation of a new packet having the primary PID and shadow packet's payload.

51 Claims, 4 Drawing Sheets

U.S. PATENT DOCUMENTS

| | | | |
|---|---|---|---|
| 4,381,519 A | 4/1983 | Wilkinson et al. | |
| 4,419,693 A | 12/1983 | Wilkinson | |
| 4,521,853 A | 6/1985 | Guttag | |
| 4,634,808 A | 1/1987 | Moerder | |
| 4,700,387 A | 10/1987 | Hirata | |
| 4,703,351 A | 10/1987 | Kondo | |
| 4,703,352 A | 10/1987 | Kondo | |
| 4,710,811 A | 12/1987 | Kondo | |
| 4,712,238 A | 12/1987 | Gilhousen et al. | |
| 4,722,003 A | 1/1988 | Kondo | |
| 4,739,510 A | 4/1988 | Jeffers et al. | |
| 4,772,947 A | 9/1988 | Kono | |
| 4,785,361 A | 11/1988 | Brotby | |
| 4,788,589 A | 11/1988 | Kondo | |
| 4,815,078 A | 3/1989 | Shimura | |
| 4,845,560 A | 7/1989 | Kondo et al. | |
| 4,881,263 A | 11/1989 | Herbison et al. | |
| 4,887,296 A | 12/1989 | Horne | |
| 4,890,161 A | 12/1989 | Kondo | |
| 4,914,515 A | 4/1990 | Van Luyt | |
| 4,924,310 A | 5/1990 | von Brandt | |
| 4,944,006 A | 7/1990 | Citta et al. | |
| 4,953,023 A | 8/1990 | Kondo | |
| 4,964,126 A | 10/1990 | Musicus et al. | |
| 4,989,245 A | 1/1991 | Bennett | |
| 4,995,080 A | 2/1991 | Bestler et al. | |
| 5,018,197 A | 5/1991 | Jones et al. | |
| 5,023,710 A | 6/1991 | Kondo et al. | |
| 5,091,936 A | 2/1992 | Katznelson | |
| 5,122,873 A | 6/1992 | Golin | |
| 5,138,659 A | 8/1992 | Kelkar et al. | |
| 5,142,537 A | 8/1992 | Kutner et al. | |
| 5,144,662 A | 9/1992 | Welmer | |
| 5,144,664 A | 9/1992 | Esserman et al. | |
| 5,151,782 A | 9/1992 | Ferraro | |
| 5,159,452 A | 10/1992 | Kinoshita et al. | |
| 5,159,633 A | 10/1992 | Nakamura | |
| 5,195,135 A | 3/1993 | Palmer | |
| 5,196,931 A | 3/1993 | Kondo | |
| 5,208,816 A | 5/1993 | Seshardi et al. | |
| 5,237,424 A | 8/1993 | Nishino et al. | |
| 5,237,610 A | 8/1993 | Gammie et al. | |
| 5,241,381 A | 8/1993 | Kondo | |
| 5,247,575 A | 9/1993 | Sprague et al. | |
| 5,258,835 A | 11/1993 | Kato | |
| 5,319,707 A | 6/1994 | Wasilewski et al. | |
| 5,319,712 A | 6/1994 | Finkelstein et al. | |
| 5,325,432 A | 6/1994 | Gardeck et al. | |
| 5,327,502 A | 7/1994 | Katata | |
| 5,341,425 A | 8/1994 | Wasilewski et al. | |
| 5,359,694 A | 10/1994 | Concordel | |
| 5,379,072 A | 1/1995 | Kondo | |
| 5,381,481 A | 1/1995 | Gammie et al. | |
| 5,398,078 A | 3/1995 | Masuda et al. | |
| 5,400,401 A | 3/1995 | Wasilewski et al. | |
| 5,414,852 A | 5/1995 | Kramer et al. | |
| 5,416,651 A | 5/1995 | Uetake et al. | |
| 5,416,847 A | 5/1995 | Boze | |
| 5,420,866 A | 5/1995 | Wasilewski | |
| 5,428,403 A | 6/1995 | Andrew et al. | |
| 5,434,716 A | 7/1995 | Sugiyama et al. | |
| 5,438,369 A | 8/1995 | Citta et al. | |
| 5,444,491 A | 8/1995 | Lim | |
| 5,444,782 A | 8/1995 | Adams, Jr. et al. | |
| 5,455,862 A | 10/1995 | Hoskinson | |
| 5,469,216 A | 11/1995 | Takahashi et al. | |
| 5,471,501 A | 11/1995 | Parr et al. | |
| 5,473,692 A | 12/1995 | Davis | |
| 5,477,263 A * | 12/1995 | O'Callaghan et al. | 725/102 |
| 5,481,554 A | 1/1996 | Kondo | |
| 5,481,627 A | 1/1996 | Kim | |
| 5,485,577 A | 1/1996 | Eyer et al. | |
| 5,491,748 A | 2/1996 | Auld, Jr. et al. | |
| 5,515,107 A | 5/1996 | Chiang et al. | |
| 5,526,427 A | 6/1996 | Thomas et al. | |
| 5,528,608 A | 6/1996 | Shimizume | |
| 5,535,276 A | 7/1996 | Ganesan | |
| 5,539,823 A | 7/1996 | Martin | |
| 5,539,828 A | 7/1996 | Davis | |
| 5,553,141 A | 9/1996 | Lowry et al. | |
| 5,555,305 A | 9/1996 | Robinson et al. | |
| 5,561,713 A | 10/1996 | Suh | |
| 5,568,552 A | 10/1996 | Davis | |
| 5,574,787 A | 11/1996 | Ryan | |
| 5,582,470 A | 12/1996 | Yu | |
| 5,583,576 A | 12/1996 | Perlman et al. | |
| 5,583,863 A | 12/1996 | Darr, Jr. et al. | |
| 5,590,202 A | 12/1996 | Bestler et al. | |
| 5,594,507 A | 1/1997 | Hoarty | |
| 5,598,214 A | 1/1997 | Kondo et al. | |
| 5,600,378 A | 2/1997 | Wasilewski | |
| 5,600,721 A | 2/1997 | Kitazato | |
| 5,606,359 A | 2/1997 | Youden et al. | |
| 5,608,448 A | 3/1997 | Smoral et al. | |
| 5,615,265 A | 3/1997 | Coutrot | |
| 5,617,333 A | 4/1997 | Oyamada et al. | |
| 5,625,715 A | 4/1997 | Trew et al. | |
| 5,629,866 A | 5/1997 | Carrubba et al. | |
| 5,629,981 A | 5/1997 | Nerlikar | |
| 5,652,615 A | 7/1997 | Bryant et al. | |
| 5,652,795 A | 7/1997 | Eillon et al. | |
| 5,663,764 A | 9/1997 | Kondo et al. | |
| 5,666,293 A | 9/1997 | Metz et al. | |
| 5,696,906 A | 12/1997 | Peters et al. | |
| 5,699,429 A | 12/1997 | Tamer et al. | |
| 5,703,889 A | 12/1997 | Shimoda et al. | |
| 5,717,814 A | 2/1998 | Abecassis | |
| 5,726,702 A | 3/1998 | Hamaguchi et al. | |
| 5,726,711 A | 3/1998 | Boyce | |
| 5,732,346 A | 3/1998 | Lazaridis et al. | |
| 5,742,680 A | 4/1998 | Wilson | |
| 5,742,681 A | 4/1998 | Giachetti et al. | |
| 5,751,280 A | 5/1998 | Abbott et al. | |
| 5,751,743 A | 5/1998 | Takizawa | |
| 5,751,813 A | 5/1998 | Dorenbos | |
| 5,754,650 A | 5/1998 | Katznelson | |
| 5,754,658 A | 5/1998 | Aucsmith | |
| 5,757,417 A | 5/1998 | Aras et al. | |
| 5,757,909 A | 5/1998 | Park | |
| 5,761,180 A * | 6/1998 | Murabayashi et al. | 369/53.44 |
| 5,768,539 A | 6/1998 | Metz et al. | |
| 5,796,786 A | 8/1998 | Lee | |
| 5,796,829 A | 8/1998 | Newby et al. | |
| 5,796,840 A | 8/1998 | Davis | |
| 5,802,176 A | 9/1998 | Audebert | |
| 5,805,700 A | 9/1998 | Nardone et al. | |
| 5,805,712 A | 9/1998 | Davis | |
| 5,805,762 A | 9/1998 | Boyce et al. | |
| 5,809,147 A | 9/1998 | De Lange et al. | |
| 5,815,146 A | 9/1998 | Youden et al. | |
| 5,818,934 A | 10/1998 | Cuccia | |
| 5,825,879 A | 10/1998 | Davis | |
| 5,835,668 A | 11/1998 | Yanagihara | |
| 5,838,873 A * | 11/1998 | Blatter et al. | 386/95 |
| 5,850,218 A | 12/1998 | LaJoie et al. | |
| 5,852,290 A | 12/1998 | Chaney | |
| 5,852,470 A | 12/1998 | Kondo et al. | |
| 5,870,474 A | 2/1999 | Wasilewski et al. | |
| 5,892,900 A | 4/1999 | Ginter et al. | |
| 5,894,320 A | 4/1999 | Vancelette | |
| 5,894,516 A | 4/1999 | Brandenburg | |
| 5,905,732 A | 5/1999 | Fimoff et al. | |

| | | | | | | |
|---|---|---|---|---|---|---|
| 5,915,018 | A | 6/1999 | Aucsmith | 6,226,618 | B1 | 5/2001 | Downs |
| 5,917,830 | A | 6/1999 | Chen et al. | 6,229,895 | B1 | 5/2001 | Son et al. |
| 5,920,625 | A | 7/1999 | Davies | 6,230,194 | B1 | 5/2001 | Frailong et al. |
| 5,920,626 | A | 7/1999 | Durden et al. | 6,230,266 | B1 | 5/2001 | Perlman et al. |
| 5,922,048 | A | 7/1999 | Emura | 6,236,727 | B1 | 5/2001 | Ciacelli et al. |
| 5,923,755 | A | 7/1999 | Birch et al. | 6,240,553 | B1 | 5/2001 | Son et al. |
| 5,930,361 | A | 7/1999 | Hayashi et al. | 6,246,720 | B1 | 6/2001 | Kutner et al. |
| 5,933,500 | A | 8/1999 | Blatter et al. | 6,256,747 | B1 | 7/2001 | Inohara et al. |
| 5,940,505 | A * | 8/1999 | Kanamaru ............... 705/58 | 6,263,506 | B1 | 7/2001 | Ezaki et al. |
| 5,940,738 | A | 8/1999 | Rao | 6,266,416 | B1 | 7/2001 | Sigbjornsen et al. |
| 5,943,605 | A | 8/1999 | Koepele, Jr. | 6,266,480 | B1 | 7/2001 | Ezaki et al. |
| 5,949,877 | A | 9/1999 | Traw et al. | 6,272,538 | B1 | 8/2001 | Holden et al. |
| 5,949,881 | A | 9/1999 | Davis | 6,278,783 | B1 | 8/2001 | Kocher et al. |
| 5,963,909 | A | 10/1999 | Warren et al. | 6,289,455 | B1 | 9/2001 | Kocher et al. |
| 5,973,679 | A | 10/1999 | Abbott et al. | 6,292,568 | B1 | 9/2001 | Akins, III et al. |
| 5,973,722 | A | 10/1999 | Wakai et al. | 6,292,892 | B1 | 9/2001 | Davis |
| 5,973,726 | A | 10/1999 | Iijima et al. | 6,307,939 | B1 | 10/2001 | Vigarie |
| 5,999,622 | A | 12/1999 | Yasukawa et al. | 6,311,012 | B1 | 10/2001 | Cho et al. |
| 5,999,698 | A | 12/1999 | Nakai et al. | 6,314,111 | B1 | 11/2001 | Nandikonda et al. |
| 6,005,561 | A | 12/1999 | Hawkins et al. | 6,314,409 | B2 | 11/2001 | Schneck et al. |
| 6,005,940 | A * | 12/1999 | Kulinets ............... 705/51 | 6,323,914 | B1 | 11/2001 | Linzer |
| 6,011,849 | A | 1/2000 | Orrin | 6,324,288 | B1 | 11/2001 | Hoffman |
| 6,012,144 | A | 1/2000 | Pickett | 6,327,421 | B1 | 12/2001 | Tiwari et al. |
| 6,016,348 | A | 1/2000 | Blatter et al. | 6,337,947 | B1 | 1/2002 | Porter et al. |
| 6,021,199 | A | 2/2000 | Ishibashi | 6,351,538 | B1 | 2/2002 | Uz |
| 6,021,201 | A | 2/2000 | Bakhle et al. | 6,351,813 | B1 | 2/2002 | Mooney et al. |
| 6,026,164 | A | 2/2000 | Sakamoto et al. | 6,377,589 | B1 | 4/2002 | Knight et al. |
| 6,028,932 | A | 2/2000 | Park | 6,378,130 | B1 | 4/2002 | Adams |
| 6,049,613 | A | 4/2000 | Jakobsson | 6,389,533 | B1 | 5/2002 | Davis et al. |
| 6,055,314 | A | 4/2000 | Spies et al. | 6,389,537 | B1 | 5/2002 | Davis et al. |
| 6,055,315 | A | 4/2000 | Doyle et al. | 6,415,031 | B1 | 7/2002 | Colligan et al. |
| 6,057,832 | A | 5/2000 | Lev et al. | 6,415,101 | B1 | 7/2002 | deCarmo et al. |
| 6,057,872 | A | 5/2000 | Candelore | 6,418,169 | B1 | 7/2002 | Datari |
| 6,058,186 | A | 5/2000 | Enari | 6,424,717 | B1 | 7/2002 | Pinder et al. |
| 6,058,192 | A | 5/2000 | Guralnick et al. | 6,430,361 | B2 | 8/2002 | Lee |
| 6,061,451 | A | 5/2000 | Muratani et al. | 6,445,738 | B1 | 9/2002 | Zdepski et al. |
| 6,061,471 | A | 5/2000 | Coleman | 6,449,718 | B1 | 9/2002 | Rucklidge et al. |
| 6,064,676 | A | 5/2000 | Slattery et al. | 6,452,923 | B1 | 9/2002 | Gerszberg et al. |
| 6,064,748 | A | 5/2000 | Hogan | 6,453,115 | B1 | 9/2002 | Boyle |
| 6,065,050 | A | 5/2000 | DeMoney | 6,453,116 | B1 * | 9/2002 | Ando et al. ............... 386/68 |
| 6,069,647 | A | 5/2000 | Sullivan et al. | 6,456,985 | B1 | 9/2002 | Ohtsuka |
| 6,070,245 | A | 5/2000 | Murphy, Jr. et al. | 6,459,427 | B1 | 10/2002 | Mao et al. |
| 6,072,872 | A | 6/2000 | Chang et al. | 6,463,152 | B1 | 10/2002 | Takahashi |
| 6,072,873 | A | 6/2000 | Bewick | 6,466,671 | B1 | 10/2002 | Maillard et al. |
| 6,073,122 | A | 6/2000 | Wool | 6,473,459 | B1 | 10/2002 | Sugano et al. |
| 6,088,450 | A | 7/2000 | Davis et al. | 6,480,551 | B1 | 11/2002 | Ohishi et al. |
| 6,105,134 | A | 8/2000 | Pinder et al. | 6,490,728 | B1 | 12/2002 | Kitazato et al. |
| 6,108,422 | A | 8/2000 | Newby et al. | 6,505,032 | B1 | 1/2003 | McCorkle et al. |
| 6,115,821 | A | 9/2000 | Newby et al. | 6,505,299 | B1 | 1/2003 | Zeng et al. |
| 6,118,873 | A | 9/2000 | Lotspiech et al. | 6,510,554 | B1 | 1/2003 | Gordon et al. |
| 6,134,237 | A | 10/2000 | Brailean et al. | 6,519,693 | B1 | 2/2003 | Debey |
| 6,134,551 | A | 10/2000 | Aucsmith | 6,526,144 | B2 | 2/2003 | Markandey et al. |
| 6,138,237 | A | 10/2000 | Ruben et al. | 6,529,526 | B1 | 3/2003 | Schneidewend |
| 6,148,082 | A | 11/2000 | Slattery et al. | 6,543,053 | B1 | 4/2003 | Li et al. |
| 6,154,206 | A | 11/2000 | Ludtke | 6,549,229 | B1 | 4/2003 | Kirby et al. |
| 6,157,719 | A | 12/2000 | Wasilewski et al. | 6,550,008 | B1 | 4/2003 | Zhang et al. |
| 6,170,075 | B1 | 1/2001 | Schuster et al. | 6,557,031 | B1 | 4/2003 | Mimura et al. |
| 6,181,334 | B1 | 1/2001 | Freeman et al. | 6,587,561 | B1 | 7/2003 | Sered et al. |
| 6,181,364 | B1 | 1/2001 | Ford | 6,590,979 | B1 | 7/2003 | Ryan |
| 6,185,369 | B1 | 2/2001 | Ko et al. | 6,621,866 | B1 | 9/2003 | Florencio et al. |
| 6,185,546 | B1 | 2/2001 | Davis | 6,621,979 | B1 | 9/2003 | Eerenberg et al. |
| 6,189,096 | B1 | 2/2001 | Haverty | 6,640,145 | B2 | 10/2003 | Hoffberg et al. |
| 6,192,131 | B1 | 2/2001 | Geer et al. | 6,640,305 | B2 | 10/2003 | Kocher et al. |
| 6,199,053 | B1 | 3/2001 | Herbert et al. | 6,643,298 | B1 | 11/2003 | Brunheroto et al. |
| 6,201,798 | B1 * | 3/2001 | Campanella et al. ......... 370/326 | 6,650,754 | B1 | 11/2003 | Akiyama et al. |
| 6,201,927 | B1 | 3/2001 | Comer | 6,654,389 | B1 | 11/2003 | Brunheroto et al. |
| 6,204,843 | B1 | 3/2001 | Freeman et al. | 6,678,740 | B1 | 1/2004 | Rakib et al. |
| 6,209,098 | B1 | 3/2001 | Davis | 6,681,326 | B2 | 1/2004 | Son et al. |
| 6,215,484 | B1 | 4/2001 | Freeman et al. | 6,684,250 | B2 | 1/2004 | Anderson et al. |
| 6,219,358 | B1 | 4/2001 | Pinder et al. | 6,697,489 | B1 * | 2/2004 | Candelore ............... 380/200 |
| 6,222,924 | B1 | 4/2001 | Salomaki | 6,697,944 | B1 | 2/2004 | Jones et al. |
| 6,223,290 | B1 | 4/2001 | Larsen et al. | 6,701,258 | B2 * | 3/2004 | Kramb et al. ............... 702/33 |
| 6,226,385 | B1 | 5/2001 | Taguchi et al. | 6,704,733 | B2 | 3/2004 | Clark et al. |

| | | |
|---|---|---|
| 6,707,696 B1 | 3/2004 | Turner et al. |
| 6,714,650 B1 | 3/2004 | Maillard et al. |
| 6,741,795 B1 | 5/2004 | Takehiko et al. |
| 6,754,276 B1 | 6/2004 | Harumoto et al. |
| 6,772,340 B1 | 8/2004 | Peinado et al. |
| 6,788,690 B2 | 9/2004 | Harri |
| 6,788,882 B1 | 9/2004 | Geer et al. |
| 6,826,185 B1 | 11/2004 | Montanaro et al. |
| 6,834,110 B1* | 12/2004 | Marconcini et al. ......... 380/239 |
| 6,853,728 B1 | 2/2005 | Kahn et al. |
| 6,883,050 B1 | 4/2005 | Safadi |
| 6,891,565 B1 | 5/2005 | Dieterich |
| 6,895,128 B2 | 5/2005 | Bohnenkamp |
| 6,898,285 B1* | 5/2005 | Hutchings et al. ........... 380/200 |
| 6,904,520 B1 | 6/2005 | Rosset et al. |
| 6,917,684 B1 | 7/2005 | Tatebayashi et al. |
| 6,925,180 B2 | 8/2005 | Iwamura |
| 6,938,162 B1 | 8/2005 | Nagai et al. |
| 6,976,166 B2 | 12/2005 | Herley et al. |
| 6,988,238 B1 | 1/2006 | Kovacevic et al. |
| 7,020,284 B2* | 3/2006 | Boykin et al. ............... 380/200 |
| 7,023,924 B1 | 4/2006 | Keller et al. |
| 7,039,802 B1 | 5/2006 | Eskicioglu et al. |
| 7,039,938 B2 | 5/2006 | Candelore |
| 7,055,166 B1 | 5/2006 | Logan et al. |
| 7,065,213 B2 | 6/2006 | Pinder |
| 7,079,752 B1* | 7/2006 | Leyendecker ................ 386/94 |
| 7,089,579 B1 | 8/2006 | Mao et al. |
| 7,096,481 B1 | 8/2006 | Forecast et al. |
| 7,096,487 B1 | 8/2006 | Gordon et al. |
| 7,110,659 B2 | 9/2006 | Fujie et al. |
| 7,120,250 B2 | 10/2006 | Candelore |
| 7,124,303 B2 | 10/2006 | Candelore |
| 7,127,619 B2 | 10/2006 | Unger et al. |
| 7,139,398 B2 | 11/2006 | Candelore et al. |
| 7,146,007 B1 | 12/2006 | Maruo et al. |
| 7,151,831 B2 | 12/2006 | Candelore et al. |
| 7,151,833 B2 | 12/2006 | Candelore et al. |
| 7,155,012 B2 | 12/2006 | Candelore et al. |
| 7,158,185 B2 | 1/2007 | Gastaldi |
| 7,194,758 B1 | 3/2007 | Waki et al. |
| 7,221,695 B1* | 5/2007 | Hwang et al. ............... 375/130 |
| 7,221,706 B2 | 5/2007 | Zhao et al. |
| 7,292,692 B2 | 11/2007 | Bonan et al. |
| 7,298,959 B1 | 11/2007 | Hallberg et al. |
| 7,308,104 B1* | 12/2007 | Kim et al. ................... 380/268 |
| 7,336,785 B1 | 2/2008 | Lu et al. |
| 7,391,866 B2 | 6/2008 | Fukami et al. |
| 7,490,236 B2 | 2/2009 | Wasilewski |
| 7,496,198 B2 | 2/2009 | Pinder et al. |
| 7,508,454 B1 | 3/2009 | Vantalon et al. |
| 7,555,123 B2 | 6/2009 | Pinder et al. |
| 7,580,525 B1* | 8/2009 | Ejima ......................... 380/268 |
| 7,609,022 B2* | 10/2009 | Oyobe et al. ................. 318/800 |
| 7,769,053 B2* | 8/2010 | Kubota et al. ............... 370/486 |
| 2001/0013123 A1 | 8/2001 | Freeman et al. |
| 2001/0024471 A1 | 9/2001 | Bordes et al. |
| 2001/0030959 A1 | 10/2001 | Ozawa et al. |
| 2001/0036271 A1 | 11/2001 | Javed |
| 2001/0051007 A1 | 12/2001 | Teshima |
| 2002/0003881 A1 | 1/2002 | Reitmeier et al. |
| 2002/0021805 A1 | 2/2002 | Schumann et al. |
| 2002/0023013 A1 | 2/2002 | Hughes et al. |
| 2002/0026478 A1 | 2/2002 | Rodgers et al. |
| 2002/0026587 A1 | 2/2002 | Talstra et al. |
| 2002/0036717 A1 | 3/2002 | Abiko et al. |
| 2002/0044558 A1 | 4/2002 | Gobbi et al. |
| 2002/0046406 A1 | 4/2002 | Chelehmal et al. |
| 2002/0047915 A1 | 4/2002 | Misu |
| 2002/0056093 A1 | 5/2002 | Kunkel et al. |
| 2002/0059425 A1 | 5/2002 | Belfiore et al. |
| 2002/0065678 A1 | 5/2002 | Peliotis et al. |
| 2002/0066101 A1 | 5/2002 | Gordon et al. |
| 2002/0067436 A1 | 6/2002 | Shirahama et al. |
| 2002/0083317 A1 | 6/2002 | Ohta et al. |
| 2002/0083438 A1 | 6/2002 | So et al. |
| 2002/0083439 A1 | 6/2002 | Eldering |
| 2002/0097322 A1 | 7/2002 | Monroe et al. |
| 2002/0100054 A1 | 7/2002 | Feinberg et al. |
| 2002/0108035 A1* | 8/2002 | Herley et al. ................ 713/165 |
| 2002/0109707 A1 | 8/2002 | Lao et al. |
| 2002/0116705 A1 | 8/2002 | Perlman et al. |
| 2002/0126890 A1 | 9/2002 | Katayama et al. |
| 2002/0129243 A1 | 9/2002 | Nanjundiah |
| 2002/0144116 A1 | 10/2002 | Giobbi |
| 2002/0144260 A1 | 10/2002 | Devara |
| 2002/0150239 A1 | 10/2002 | Carny et al. |
| 2002/0157115 A1 | 10/2002 | Lu |
| 2002/0164022 A1 | 11/2002 | Strasser et al. |
| 2002/0170053 A1 | 11/2002 | Peterka et al. |
| 2002/0184506 A1 | 12/2002 | Perlman |
| 2002/0194589 A1 | 12/2002 | Cristofalo et al. |
| 2002/0194613 A1 | 12/2002 | Unger |
| 2002/0196939 A1 | 12/2002 | Unger et al. |
| 2003/0002854 A1 | 1/2003 | Belknap et al. |
| 2003/0009669 A1 | 1/2003 | White et al. |
| 2003/0012286 A1 | 1/2003 | Ishtiaq et al. |
| 2003/0021412 A1 | 1/2003 | Candelore et al. |
| 2003/0026423 A1 | 2/2003 | Unger et al. |
| 2003/0028879 A1 | 2/2003 | Gordon et al. |
| 2003/0034997 A1 | 2/2003 | McKain et al. |
| 2003/0035482 A1 | 2/2003 | Klompenhouwer et al. |
| 2003/0035540 A1 | 2/2003 | Freeman et al. |
| 2003/0035543 A1 | 2/2003 | Gillon |
| 2003/0046686 A1 | 3/2003 | Candelore et al. |
| 2003/0046687 A1 | 3/2003 | Hodges et al. |
| 2003/0059047 A1 | 3/2003 | Iwamura |
| 2003/0063615 A1 | 4/2003 | Luoma et al. |
| 2003/0072555 A1 | 4/2003 | Yap et al. |
| 2003/0077071 A1 | 4/2003 | Lin et al. |
| 2003/0081630 A1 | 5/2003 | Mowery et al. |
| 2003/0081776 A1 | 5/2003 | Candelore |
| 2003/0084284 A1 | 5/2003 | Ando et al. |
| 2003/0097662 A1 | 5/2003 | Russ et al. |
| 2003/0108199 A1 | 6/2003 | Pinder et al. |
| 2003/0112333 A1 | 6/2003 | Chen et al. |
| 2003/0118243 A1 | 6/2003 | Sezer et al. |
| 2003/0123664 A1 | 7/2003 | Pedlow et al. |
| 2003/0123849 A1 | 7/2003 | Nallur et al. |
| 2003/0126086 A1 | 7/2003 | Safadi |
| 2003/0133570 A1 | 7/2003 | Candelore et al. |
| 2003/0140257 A1 | 7/2003 | Peterka et al. |
| 2003/0145329 A1 | 7/2003 | Candelore |
| 2003/0152224 A1 | 8/2003 | Candelore et al. |
| 2003/0152226 A1 | 8/2003 | Candelore et al. |
| 2003/0152232 A1 | 8/2003 | Pirila et al. |
| 2003/0156718 A1 | 8/2003 | Candelore et al. |
| 2003/0159139 A1 | 8/2003 | Candelore et al. |
| 2003/0159140 A1 | 8/2003 | Candelore |
| 2003/0159152 A1 | 8/2003 | Lin et al. |
| 2003/0174837 A1 | 9/2003 | Candelore et al. |
| 2003/0174844 A1 | 9/2003 | Candelore |
| 2003/0188154 A1 | 10/2003 | Dallard et al. |
| 2003/0188164 A1 | 10/2003 | Okimoto et al. |
| 2003/0190054 A1 | 10/2003 | Troyansky et al. |
| 2003/0193973 A1 | 10/2003 | Takashimizu et al. |
| 2003/0198223 A1 | 10/2003 | Mack et al. |
| 2003/0204717 A1 | 10/2003 | Kuehnel |
| 2003/0222994 A1 | 12/2003 | Dawson |
| 2003/0226149 A1 | 12/2003 | Chun et al. |
| 2003/0228018 A1 | 12/2003 | Vince |
| 2004/0003008 A1 | 1/2004 | Wasilewski et al. |
| 2004/0010717 A1 | 1/2004 | Simec et al. |
| 2004/0021764 A1 | 2/2004 | Driscoll, Jr. et al. |
| 2004/0028227 A1 | 2/2004 | Yu |
| 2004/0037421 A1 | 2/2004 | Truman |

| | | | |
|---|---|---|---|
| 2004/0047470 A1 | 3/2004 | Candelore | |
| 2004/0049688 A1 | 3/2004 | Candelore et al. | |
| 2004/0049690 A1 | 3/2004 | Candelore et al. | |
| 2004/0049691 A1 | 3/2004 | Candelore et al. | |
| 2004/0049694 A1 | 3/2004 | Candelore | |
| 2004/0064688 A1 | 4/2004 | Jacobs | |
| 2004/0068659 A1 | 4/2004 | Diehl | |
| 2004/0073917 A1 | 4/2004 | Pedlow, Jr. et al. | |
| 2004/0078575 A1 | 4/2004 | Morten et al. | |
| 2004/0081333 A1 | 4/2004 | Grab et al. | |
| 2004/0083117 A1 | 4/2004 | Chen et al. | |
| 2004/0086127 A1 | 5/2004 | Candelore | |
| 2004/0088552 A1 | 5/2004 | Candelore | |
| 2004/0088558 A1 | 5/2004 | Candelore | |
| 2004/0091109 A1 | 5/2004 | Son et al. | |
| 2004/0100510 A1 | 5/2004 | Milic-Frayling et al. | |
| 2004/0123094 A1 | 6/2004 | Sprunk | |
| 2004/0136532 A1 | 7/2004 | Pinder et al. | |
| 2004/0139337 A1 | 7/2004 | Pinder et al. | |
| 2004/0151314 A1 | 8/2004 | Candelore | |
| 2004/0158721 A1 | 8/2004 | Candelore | |
| 2004/0165586 A1 | 8/2004 | Read et al. | |
| 2004/0168121 A1 | 8/2004 | Matz | |
| 2004/0172650 A1 | 9/2004 | Hawkins et al. | |
| 2004/0181666 A1 | 9/2004 | Candelore | |
| 2004/0187161 A1 | 9/2004 | Cao | |
| 2004/0193550 A1 | 9/2004 | Siegel | |
| 2004/0240668 A1 | 12/2004 | Bonan et al. | |
| 2004/0247122 A1 | 12/2004 | Hobrock et al. | |
| 2004/0261099 A1 | 12/2004 | Durden et al. | |
| 2004/0264924 A1 | 12/2004 | Campisano et al. | |
| 2004/0267602 A1 | 12/2004 | Gaydos et al. | |
| 2005/0004875 A1 | 1/2005 | Kontio et al. | |
| 2005/0015816 A1 | 1/2005 | Christofalo et al. | |
| 2005/0028193 A1 | 2/2005 | Candelore et al. | |
| 2005/0036067 A1 | 2/2005 | Ryal et al. | |
| 2005/0063541 A1 | 3/2005 | Candelore | |
| 2005/0066357 A1 | 3/2005 | Ryal | |
| 2005/0071669 A1 | 3/2005 | Medvinsky et al. | |
| 2005/0094808 A1 | 5/2005 | Pedlow, Jr. et al. | |
| 2005/0094809 A1 | 5/2005 | Pedlow, Jr. et al. | |
| 2005/0097596 A1 | 5/2005 | Pedlow, Jr. | |
| 2005/0097597 A1 | 5/2005 | Pedlow, Jr. et al. | |
| 2005/0097598 A1 | 5/2005 | Pedlow, Jr. et al. | |
| 2005/0097614 A1 | 5/2005 | Pedlow, Jr. et al. | |
| 2005/0102702 A1 | 5/2005 | Candelore et al. | |
| 2005/0129233 A1 | 6/2005 | Pedlow, Jr. | |
| 2005/0141713 A1 | 6/2005 | Genevois | |
| 2005/0169473 A1 | 8/2005 | Candelore | |
| 2005/0192904 A1 | 9/2005 | Candelore | |
| 2005/0198586 A1 | 9/2005 | Sekiguchi et al. | |
| 2005/0259813 A1* | 11/2005 | Wasilewski et al. | 380/28 |
| 2005/0265547 A1 | 12/2005 | Strasser et al. | |
| 2005/0283797 A1 | 12/2005 | Eldering et al. | |
| 2006/0115083 A1 | 6/2006 | Candelore et al. | |
| 2006/0130119 A1 | 6/2006 | Candelore et al. | |
| 2006/0130121 A1 | 6/2006 | Candelore et al. | |
| 2006/0136976 A1 | 6/2006 | Coupe et al. | |
| 2006/0153379 A1 | 7/2006 | Candelore et al. | |
| 2006/0168616 A1 | 7/2006 | Candelore | |
| 2006/0174264 A1 | 8/2006 | Candelore | |
| 2006/0262926 A1 | 11/2006 | Candelore et al. | |
| 2006/0269060 A1 | 11/2006 | Candelore et al. | |
| 2007/0006253 A1 | 1/2007 | Pinder et al. | |
| 2007/0091886 A1 | 4/2007 | Davis et al. | |

FOREIGN PATENT DOCUMENTS

| | | |
|---|---|---|
| EP | 0471373 | 2/1992 |
| EP | 0527611 | 7/1992 |
| EP | 0558016 | 2/1993 |
| EP | 0596826 | 4/1993 |
| EP | 7067028 | 3/1995 |
| EP | 0680209 | 4/1995 |
| EP | 0 696 141 | 7/1995 |
| EP | 0674440 | 9/1995 |
| EP | 0674441 | 9/1995 |
| EP | 0720374 | 7/1996 |
| EP | 0382764 | 4/1997 |
| EP | 0833517 | 4/1998 |
| EP | 0866615 | 9/1998 |
| EP | 0 926 894 | 6/1999 |
| EP | 1 187 483 A2 | 3/2002 |
| EP | 1187483 | 3/2002 |
| JP | 61-264371 | 11/1986 |
| JP | 0610587 | 12/1993 |
| JP | 07-046575 | 2/1995 |
| JP | 10-336624 | 12/1998 |
| JP | 2001-69480 | 3/2001 |
| JP | 11243534 | 10/2002 |
| WO | WO 86/07224 | 12/1986 |
| WO | WO 93/09525 | 5/1993 |
| WO | WO 94/10775 | 5/1994 |
| WO | WO 94/13081 | 6/1994 |
| WO | WO 94/13107 | 6/1994 |
| WO | WO 95/28058 | 4/1995 |
| WO | WO 97/38530 | 10/1997 |
| WO | WO 97/46009 | 12/1997 |
| WO | WO 98/08341 | 2/1998 |
| WO | WO 00/31964 | 6/2000 |
| WO | WO 00/59203 | 10/2000 |
| WO | WO 00/60846 | 10/2000 |
| WO | WO 00/64164 | 10/2000 |
| WO | WO 00/70817 | 11/2000 |
| WO | WO 01/26372 | 4/2001 |
| WO | WO 01/35669 | 5/2001 |
| WO | WO 01/65762 | 9/2001 |
| WO | WO 01/67667 | 9/2001 |
| WO | WO 01/78386 | 10/2001 |
| WO | WO 01/78386 A2 | 10/2001 |
| WO | WO 02/51096 | 6/2002 |

OTHER PUBLICATIONS

"Ad Agencies and Advertisers To Be Empowered with Targeted Ads Delivered by Television's Prevailing Video Servers" Article Business Section of The New York Times, Updated Thursday, Dec. 20, 2001.
"Applying Encryption to Video Communication" by Kunkelmann, pp. 41-47, Sep. 1998, Multimedia and Security Workshop at ACM Multimedia '98. Bristol, U.K.
"Comparison of MPEG Encryption Algorithms" by Qiao and Nahrstedt, Jan. 17, 1998, Preprint submitted to Elsevier Science.
"Coral Consortium Aims to Make DRM Interoperable", by Bill Rosenblatt, Oct. 7, 2004, online at http://www.drmwatch.com/standards/article.php/3418741.
"DVD Demystified—The Guidebook for DVD-Video and DVD-ROM" by Jim Taylor, Pub. McGraw-Hill, 1998, ISBN: 0-07-064841-7, pp. 134-147.
"Dynamic-Customized TV Advertising Creation and Production Tools" by SeaChange International, Web Site Literature.
"Efficient Frequency Domain Video Scrambling for Content Access Control" by Zeng and Lei, Nov. 1999, In Proc. ACM Multimedia.
"Evaluation of Selective Encryption Techniques for Secure Transmission of MPEG-Compressed Bit-Streams" by Alattar and Al-Regib, pp. IV-340 to IV-343, 1999, IEEE.
"Fast Encryption Methods for Audiovisual Data Confidentiality" by Wu and Kuo, Nov. 2000, SPIE International Symposia on Information Technologies 2000, (Boston, MA., USA).
"Improved Selective Encryption Techniques for Secure Transmission of MPEG Video Bit-Streams" by Alattar, Al-Regib and Al-Semari, pp. 256-260, 1999, IEEE.
Metro Media ™ PVR-DVD-MP3-Web—Internet publication from www.metrolink.com, undated.

"Multimedia and Security Workshop at ACM Multimedia" '98. Bristol, U.K., Sep. 1998.

"Passage ™, Freedom to Choose", 2003, Sony Electronics Inc.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"Selective Encryption and Watermarking of MPEG Video (Extended Abstract)" by Wu and Wu, Feb. 17,1997, submitted to International Conference on Image Science, Systems, and Technology, CISST'97.

"The Long March to Interoperable Digital Rights Management" by Koenen et al., pp. 1-17, 2004, IEEE.

"Transport Streams Insertion of Video in the Compressed Digital Domain" by SeaChange International, Web Site Literature, 2000.

"Visible World—A High Impact Approach to Customized Television Advertising" by Haberman, Dec. 2001, McCormac Hack Over Cablemodem, HackWatch, Aug. 10, 1998.

Anonymous, New Digital Copy Protection Proposal Would Secure Authorized Copies, PR Newswire, Nov. 1998, pp. 1-3.

Aravind, H., et al., "Image and Video Coding Standards", AT&T Technical Journal, (Jan./Feb. 1993), 67-68.

Gonzalez, R. C., et al., "Digital Image Processing", Addison Wesley Publishing Company, Inc., (1992),346-348.

Kim, et al., "Bit Rate Reduction Algorithm for a Digital VCR", IEEE Transactions on Consumer Electronics, vol. 37, No. 3, (Aug. 1, 1992),267-274.

Kondo, et al., "A New Concealment Method for Digital VCRs", IEEE Visual Signal Processing and Communication, Melbourne, Australia, (Sep. 1993),20-22.

Kondo, et al., "Adaptive Dynamic Range Coding Scheme for Future Consumer Digital VTR", 219-226.

Kondo, et al., "Adaptive Dynamic Range Coding Scheme for Future HDTV Digital VTR", Sony Corporation, (1991).

Lakshimnath, et al., "A Dual Protocol for Scalable Secure Multicasting", 1999 International Symposium on Computers and Communication, Jul. 6-8, 1999.

Lookabaugh et al., "Selective Encryption and MPEG-2", ACM Multimedia '03, Nov. 2003.

Menezes, Alfred J., et al., "Handbook of Applied Cryptography", CRC Press, 551-553.

NHK Laboratories Note, "Error Correction, Concealment and Shuffling", No. 424, (Mar. 1994),29-44.

Park, et al., "A Simple Concealment for ATM Bursty Cell Loss", IEEE Transactions on Consumer Electronics, No. 3, (Aug. 1993),704-709.

Robert et al., "Digital Cable: The Key to Your Content", Access Intelligence's Cable Group, Feb. 2002, online at http:www.cableworld.com/ct/archives/0202/0202digitalrights.htm.

Tom, et al., "Packet Video for Cell Loss Protection Using Deinterleaving and Scrambling", ICASSP 91: 1991 International Conference on Acoustics, Speech and Signal Processing, vol. 4, (Apr. 1991),2857-2860.

Zhu, et al., "Coding and Cell-Loss Recovery in DCT-Based Packet Video", IEEE Transactions on Circuits and Systems for Video Technology, No. 3, NY,(Jun. 3, 1993).

"ClearPlay: The Technology of Choice", from web site, ClearPlay 2001-2003.

Microsoft Windows XP, Oct. 2001, Microsoft, Screen Shots and Help Files.

MPEG-2 Digital Broadcast Pocket Guide vol. 6, Copyright 201 Acterna, LLC.

"Performance Study of a Selective Encryption Scheme for the Security of Networked, Real-Time Video" by Spanos and Maples, pp. 2-10, 1995, IEEE.

"An Empirical Study of Secure MPEG Video Transmissions" by Agi and Gong, pp. 137-144, 1996, IEEE, Proceedings of SNDSS '96.

"Selective Encryption and Watermarking of MPEG Video (Extended Abstract)" by Wu and Wu, Feb. 17,1997, submitted to International Conference on Image Science, Systems, and Technology, CISST'97.

"An Efficient MPEG Video Encryption Algorithm" by Shi and Bhargava, pp. 381-386, 1998 IEEE.

"Comparison of MPEG Encryption Algorithms" by Qiao and Nahrstedt, Jan. 17, 1998, Preprint submitted to Elsevier Science.

"Applying Encryption to Video Communication" by Kunkelmann, pp. 41-47, Sep. 1998, Multimedia and Security Workshop at ACM Multimedia '98. Bristol, U.K.

"Evaluation of Selective Encryption Techniques for Secure Transmission of MPEG-Compressed Bit-Streams" by Alattar and Al-Regib, pp. IV-340 to IV-343, 1999, IEEE.

"Improved Selective Encryption Techniques for Secure Transmission of MPEG Video Bit-Streams" by Alattar, Al-Regib and Al-Semari, pp. 256-260, 1999, IEEE.

"Efficient Frequency Domain Video Scrambling for Content Access Control" by Zeng and Lei, Nov. 1999, In Proc. ACM Multimedia.

"Transport Streams Insertion of Video in the Compressed Digital Domain" by SeaChange International, Web Site Literature, 2000.

"A Report on Security Issues in Multimedia" by Gulwani, pp. 10-14, Apr. 30, 2000, Course Notes, Department of Computer Science and Engineering, Indian Institute of Technology Kanpur.

"Fast Encryption Methods for Audiovisual Data Confidentiality" by Wu and Kuo, Nov. 2000, SPIE International Symposia on Information Technologies 2000, (Boston, Ma., USA).

"Visible World—A High Impact Approach to Customized Television Advertising" by Haberman, Dec. 2001.

"Ad Agencies and Advertisers To Be Empowered with Targeted Ads Delivered by Television's Prevailing Video Servers" Article Business Section of the New York Times, Updated Thursday, Dec. 20, 2001.

"Dynamic-Customized TV Advertising Creation and Production Tools" by SeaChange International, Web Site Literature.

"Selective Encryption and Watermarking of MPEG Video (Extended Abstract)" by Wu and Wu, Feb. 17, 1997, submitted to International Conference on Image Science, Systems, and Technology, CISST'97.

"Run-Time Performance Evaluation for a Secure MPEG System Supporting Both Selective Watermarking and Encryption" by Wu and Wu, Mar. 1, 1997, submitted to JSAC special issue on Copyright and Privacy Protection.

"DVD Demystified—The Guidebook for DVD-Video and DVD-ROM" by Jim Taylor, Pub. McGraw-Hill, 1998, ISBN: 0-07-064841-7, pp. 134-147.

"Multimedia and Security Workshop at ACM Multimedia" '98. Bristol, U.K., Sep. 1998.

"A Report on Security Issues in Multimedia" by Gulwani, Apr. 30, 2000, Dept. of Computer Science & Engineering, Indian Institute of Technology Kanpur.

Anonymous, New Digital Copy Protection Proposal Would Secure Authorized Copies, PR Newswire, Nov. 1998, pp. 1-3.

Liu, et al. Motion Vector Encryption in Multimedia Streaming, 2004, IEEE, pp. 64-71.

"Pre-Encryption Profiles—Concept Overview and Proposal", Rev. 1.2 as submitted to the Open CAS consortium on Dec. 28, 2000.

Alattar, A.M. et al., Improved selective encryption techniques for secure transmission of MPEG video bitstreams, Oct. 24, 1999, Digimarc Corp., Lake Oswego, OR, USA, IEEE, pp. 256-260.

Kunkelmann T. et al., A scalable security architecture for multimedia communication standards, Darmstard Univ. of Technology, Ito, Germany, 1997, pp. 660-661.

Yip, Kun-Wah, Partial-encryption technique for intellectual property protection of FPGA-Based products, Dec. 15, 1999, IEEE, pp. 183-190.

International Search Report for application No. PCT/US2004/032228.

"MPEG-2 Transmission," Dr. Gorry Fairhurst, Jan. 2001.

"MPEG-2 Compliant Trick Play Over a Digital Interface," van Gassel et al., IEEE pp. 170-171., 2002.

"How Computers Work—Millennium Edition," Ron White, Que Corporation, 1999, Mar. 16, 2009.

"How the Internet Works—Millennium Edition," Preston Gralla, Que Corporation, 1999.

"Desktop Encyclopedia of the Internet," Nathan J. Muller, Artech House, 1999.

"K-Time Encryption for K-Time Licensing," Perkins, et al., IEEE, 2002.

"Partial Encryption of Compressed Images and Videos," Howard Cheng et al. IEEE 2000.

"Secure Transmission of MPEG Video Sources," Teixeira et al., date unknown.

"DVB Conditional Access," David Cutts, Electronics and Communication Engineering Journal, Feb. 1997.

Anonymous—Functional Model of a Condtional Access System; EBU Project Group B/CA, EBU Review Technical, Winter No. 266, Grand-Saconnex, CH; pp. 64-77; 1995.

Perry et al, "Final Report of the Co-Chairs of the Broadcast Protection Discussion Subgroup to the Copy Protection Technical Working Group," Jun. 3, 2003.

Anonymous, Rehabilitation of Digital Television, CEATEC Japan 2003, Special Report, Jan. 2003. (*Translation provided by Japanese associate*).

Teixeira et al., Secure Transmission of MPEG Video Sources, Nov. 6, 1998 (*Resubmitted with date provided by Wayback machine.*).

"How Networks Work—Milennium Edition" - pp. 88-89, Oue Corporation, 2000.

* cited by examiner

RECONSTITUTION OF PROGRAM STREAMS SPLIT ACROSS MULTIPLE PACKET IDENTIFIERS

CROSS REFERENCE TO RELATED DOCUMENTS

This application is related to U.S. provisional patent application Ser. No. 60/296,673 filed Jun. 6, 2001 to Candelore, et al. entitled "Method for Allowing Multiple CA Providers to Interoperate in a Content Delivery System by Sending Video in the Clear for Some Content, and Dual Carriage of Audio and Dual Carriage of Video and Audio for Other Content", and provisional patent application Ser. No. 60/304,241 filed Jul. 10, 2001 to Unger et al., entitled "Independent Selective Encryptions of Program Contentfor Dual Carriage", and provisional patent application Ser. No. 60/304,131 filed Jul. 10, 2001 to Candelore et al., entitled "Method for Allowing Multiple CA Providers to Interoperate in a Content Delivery System by Partial Scrambling Content on a Time Slice Basis" and to U.S. provisional patent application Ser. No. 60/343,710, filed on Oct. 26, 2001 to Candelore et al., entitled "Television Encryption Systems", which are hereby incorporated herein by reference.

This application is also related to patent applications entitled "Critical Packet Partial Encryption" to Unger et al., Ser. No. 10/038,217; patent applications entitled "Time Division Partial Encryption" to Candelore et al., Ser. No. 10/038,032; entitled "Elementary Stream Partial Encryption" to Candelore, Ser. No. 10/037,914; entitled "Partial Encryption and PID Mapping" to Unger et al., Ser. No. 10/037,499; and entitled "Decoding and Decrypting of Partially Encrypted Information" to Unger et al., Ser. No. 10/037,498. These patent applications were filed simultaneously on Jan. 2, 2002 and are hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of multiply encoded program data streams identified by multiple packet identifiers (PIDs). More particularly, in certain embodiments, this invention relates to reconstitution of multiple encrypted multiple carriage program data streams.

BACKGROUND OF THE INVENTION

Several different and incompatible encryption systems are currently in use in cable television systems. In general, each encryption system is specific to a particular manufacturer and is maintained as a proprietary system. When a cable system operator (or other content distributor) builds a system around a particular manufacturer, it becomes difficult and expensive to change to another manufacturer that may provide lower cost or higher performance hardware. Thus, a content distributor is often locked into a single source of hardware (e.g., television set-top boxes).

This problem can be avoided somewhat by using a technique known as "dual carriage" (or "multiple carriage") of encrypted content. In this technique, the same program is duplicated with each copy sent with a different type of encryption. Thus, multiple set-top boxes from multiple manufacturers can coexist on the same system. Unfortunately, this technique has a serious bandwidth penalty due to the need to transmit duplicate copies of all content.

The above-referenced patent applications describe techniques referred to as "partial encryption" or "selective encryption". These techniques are used to effectively permit a virtual form of "dual carriage" (or multiple carriage) of a television program over a single distribution system (e.g., a cable television system) using multiple encryption techniques. By only partially encrypting a particular program (i.e., only encrypting certain portions of the digital data associated with a program), multiple copies of the encrypted portion of the program can be carried over the distribution system with the remaining content carried in the clear. These techniques permit a virtual form of dual carriage (or multiple carriage) of the program content with a minimal bandwidth penalty. A significant advantage of such a system is that the content provider (e.g., a cable television system operator) can use television set-top boxes (STBs) provided by multiple manufacturers that encrypt content under multiple encryption systems without suffering a large bandwidth penalty.

Figure 1:
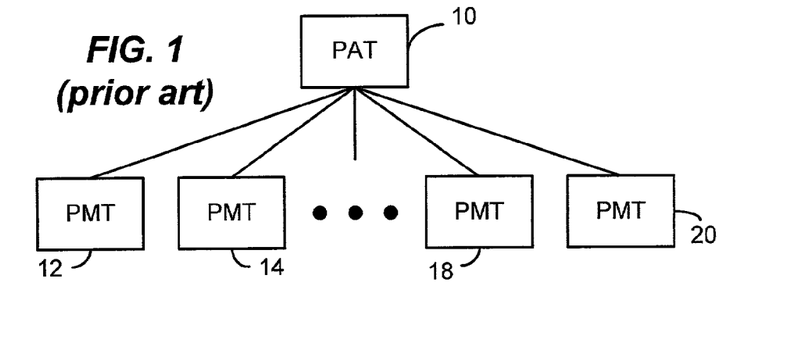
FIG. 1 depicts System Information as used in a conventional digital cable television system.

In a conventional cable system, system information (SI) is provided in the form illustrated in FIG. 1 of a Program Association Table (PAT) which contains an entry for each program. Each program in the PAT has a pointer to a particular Program Map Table (PMT) such as 12, 14, . . . 18 and 20 associated with the particular program. The PMT table contains packet Identifiers (PIDs) that are associated with the elementary streams for each program.

Figure 2:
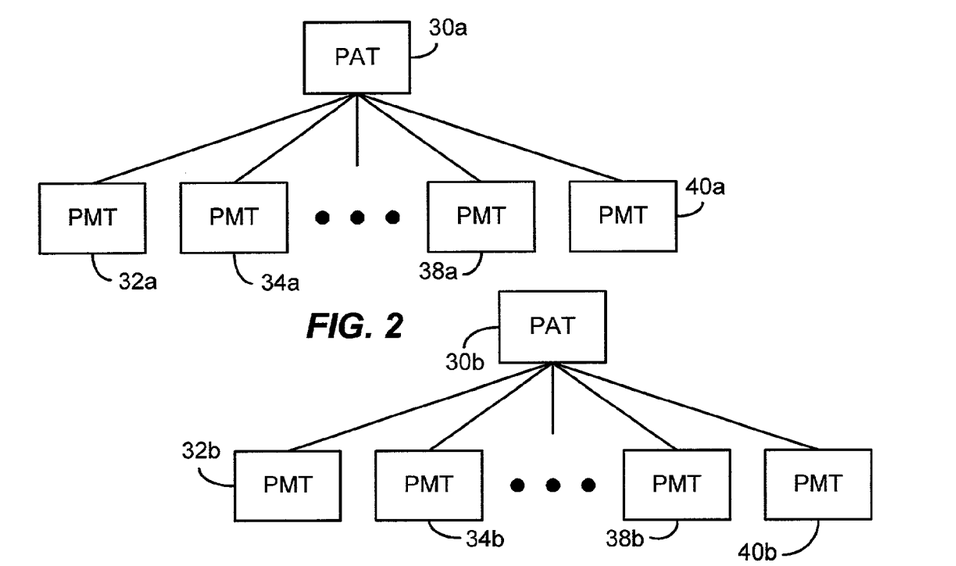
FIG. 2 illustrates how a duplicate set of System Information could be used in a dual carriage environment.

In the above-referenced patent applications, the multiple sets of encrypted packets representing the encrypted portions of the partially encrypted programs are distinguished from one another by use of distinctive packet identifiers (PLDs). Thus, for example, two encrypted portions of a program have two unique PIDs—a primary PID and a shadow (or secondary) PID. In order for the receiving equipment to determine which PIDs are associated with a particular encryption scheme, the PIT) information is transmitted from the cable system (or other distributor) headend. In one embodiment, illustrated in FIG. 2, this can be done using a duplicate set of system information (SI) to identify the various PIDs. In this example, two separate PATs 30a and 30b are used to associate programs with PMTs 32a, 34a, . . . 38a and 40a in the case of PAT 30a, and with 32b, 34b, . . . 38b and 40b in the case of PAT 30b. Each receiving system is able to detect and process whichever SI is appropriate. The system application Ser. No. 10/084,106 (e.g., the cable system headend) generating the SI creates duplicate SI for each encryption scheme used. When bandwidth is critical, the extra packets used to transmit the duplicate SI may be difficult to accommodate.

Systems that are aware that shadow PIDs exist need to know of the PID pairs and reconstitute the merged stream. The system then needs a method to reconstitute the shadow stream from the payloads of both PIDs.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 3:
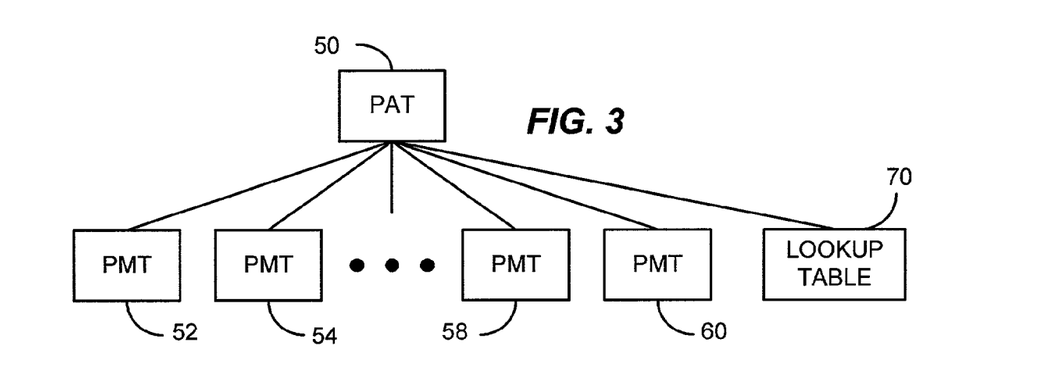
FIG. 3 illustrates System Information in accordance with certain embodiments of the present invention.

Turning now to FIG. 3, according to certain embodiments of the invention, additional SI is provided using a technique that uses only a small amount (e.g., one packet in certain embodiments) of additional information per encryption scheme used (can be shared across several programs). The PAT 50 is again associated with a plurality of PMTs 52, 54, . . . 58 and 60. Additional information is provided in the form of a translation table or lookup table 70 that translates between the primary PID used by the primary encryption scheme and the shadow PID used as a shadow substitute. This lookup table 70 is provided as a private data packet. The rest of the SI tree structure remains as if only the primary encryption scheme existed.

In certain embodiments, the PAT contains the PID of the packet with the translation table as part of a user private data section. The translation table can contain data as indicated in TABLE 1 below. The table data in the translation packet permits a lookup of each affected primary PID and its associated shadow PID. The receiving device (e.g. STB) uses this information to configure its PID filters and demultiplexers.

TABLE 1

| Primary PID | Shadow PID |
| --- | --- |
| Program 1 video | Shadow video of Program 1 |
| Program 5 video | Shadow video of Program 5 |
| Program 1 ECM | ECM to use with program 1 |
| Program 5 ECM | ECM to use with program 5 |

In utilizing this arrangement, the nominal PAT table is used to find the program of interest and the primary PIDs for that program. These primary PIDs are checked against the translation table to see if there is an associated shadow PID. If a video PID matches, then the stream reconstitution mechanism (hardware, firmware, software) is initialized with the two PIDs. If an ECM (Entitlement Control Message) PID matches, then the decryption circuit is initialized with the entitlement control message having the shadow PID instead of the primary PID.

In certain of the selective encryption arrangements described in the above-referenced patent applications, legacy receiver systems (e.g. set-top boxes) are accommodated by dual encrypting certain packets. Programs destined for the legacy system contain unencrypted packets having a first PID and encrypted packets also having the first PID. Thus, the legacy system sees encrypted and unencrypted packets having the same PID and simply decrypts packets requiring decryption. The same encrypted packets having the primary PID are also duplicated and encrypted under a second encryption system and assigned the shadow PID. Thus, for a non-legacy system (e.g., non-legacy set-top boxes) using the second encryption technique, in order to have a data stream with all the information required to decode a particular program, the unencrypted data packets with the Primary PID are combined with data packets having the shadow PID to reconstitute the total program.

Recostitution

Once the receiver device, such as a television or television set-top box has the information used to map programs to primary and shadow PIDs, the program is reconstituted by decryption of the packets with shadow PIDs and inserting the decrypted packet into the data stream containing the unencrypted packets. In accordance with the selective encryption arrangements described in the above-referenced patent applications, data packets having shadow PIDs would commonly be received with significantly reduced frequency compared with data packets having primary PIDs. The current embodiment takes advantage of this relatively slow rate of shadow packet reception to reduce PID processing in a software implemented double buffer scheme as illustrated in FIG. 4.

Not all implementations of selective encryption for virtual dual carriage can use existing hardware or firmware to implement stream reception in the set top box or other receiver. Buffering incoming data into memory in a conventional hardware facilitated (via DMA) double buffer scheme can be problematic. According to this scheme, when a buffer is full, an interrupt is generated, and the software toggles to the alternate fill buffer. Using this scheme to find packets with one or more particular PIDs, the received data in the filled buffer would then be scanned for the PIDs of interest, and then the desired packet sequence would be rebuilt. Unfortunately, such a process might introduce an undesirable delivery latency and utilize an unnecessary amount of CPU processing power to process all packets received since differentiation is not performed until the buffer is full. This potential problem can be avoided using the arrangement of FIG. 4.

Figure 4:
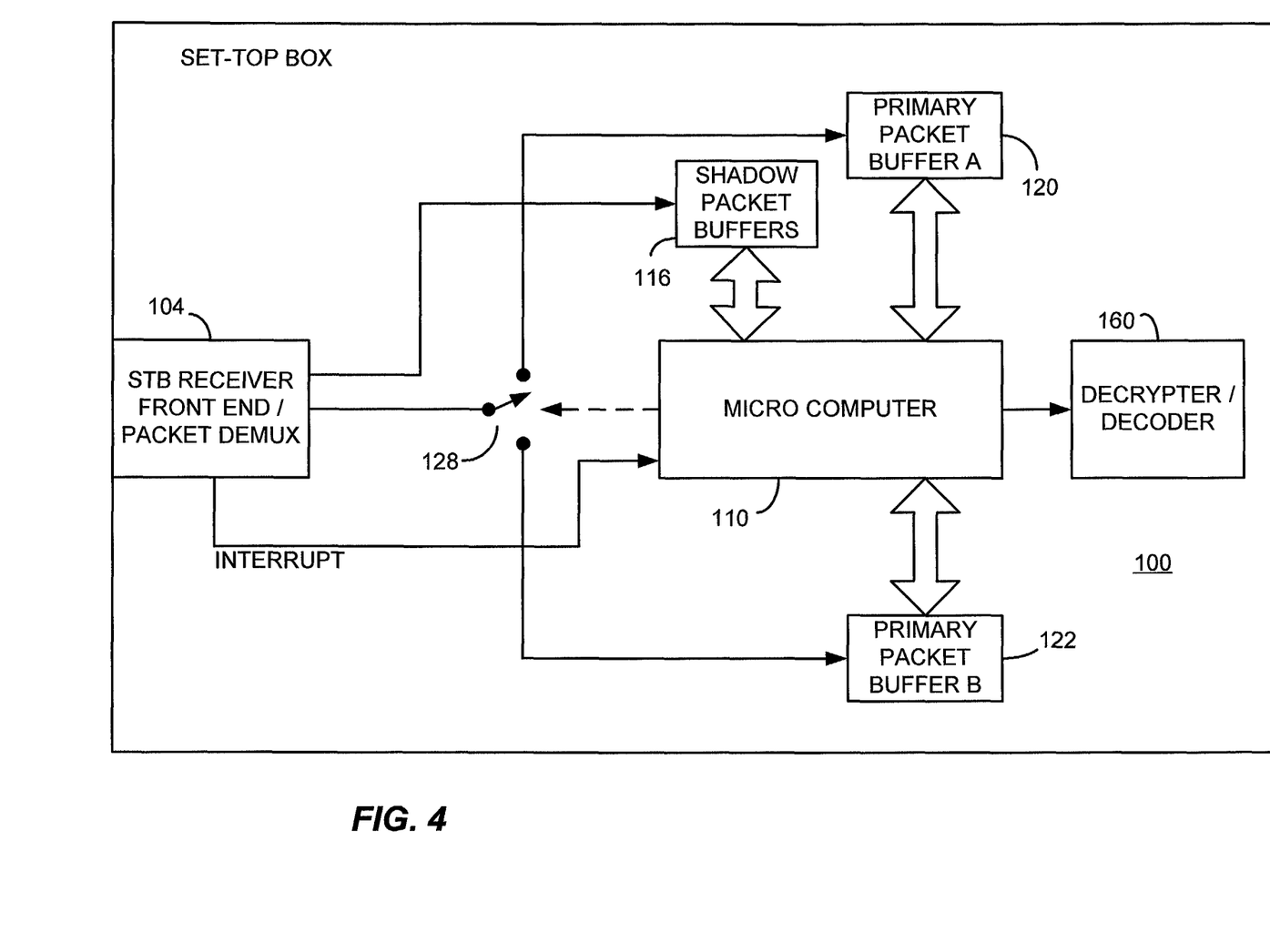
FIG. 4 illustrates a television set-top box consistent with certain embodiments of the present invention.

The STB 100 of FIG. 4 has a packet demultiplexer 104 in the STB receiver front end that is programmed to generate an interrupt to the micro computer 110 when a packet with the shadow PID is detected and stored in the shadow packet buffers 16. Primary packets are demultiplexed according to their PID at the demultiplexer 104 and sent to one of two primary packet buffers 120 and 122 in a typical toggled double buffer scheme. (A buffer pool with more than two buffers could work equally well.) Conceptually, for purposes of this explanation, the incoming data stream with the primary PID is sent to either buffer 120 or 122 based upon the position of micro computer 110 controlled switch 128 (of course, those skilled in the art will appreciate that such switching can be accomplished by addressing techniques and other equivalent methods known in the art).

Whenever a shadow packet is received and sent to buffer 116, the interrupt service routine toggles switch 128 to effectively change primary packet buffers at the shadow PID boundary. This limits the range of primary packets that the software must search in order to find the packet to be replaced by the shadow packet. Depending upon whether the headend places the shadow packet in the data stream just prior to or just after the corresponding encrypted packet having the primary PID, the corresponding packet can be found either at the end of one primary packet buffer or the beginning of the other. Latency impacts are minimized since processing occurs within very few packet times and processing bandwidth is minimized since only one or two packets must be scanned by software to identify the correct packet.

Figure 5:
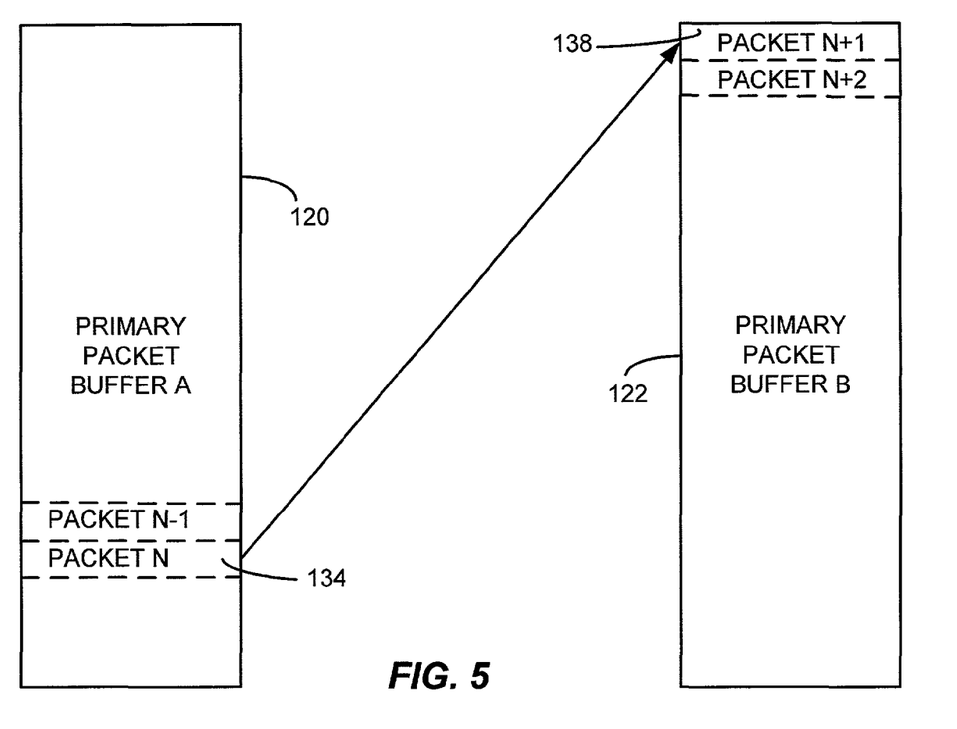
FIG. 5 illustrates the toggling of buffers in a manner consistent with certain embodiments of the present invention.
Figure 6:
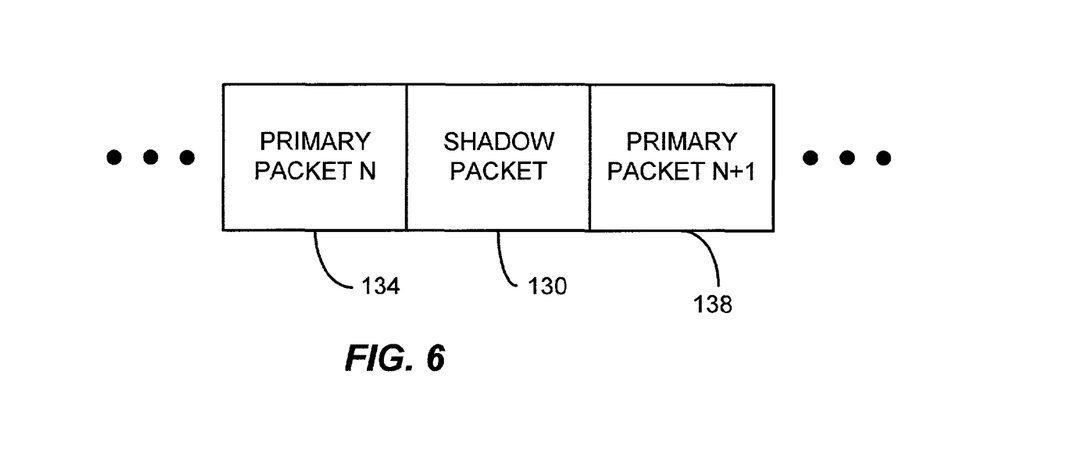
FIG. 6 shows the proximal relationship of primary and shadow packets in certain embodiments of the present invention.

This operation is illustrated in FIG. 5 in which primary packets are being loaded into primary packet buffer 120. When an interrupt is generated, by virtue of the receipt of a packet with the appropriate shadow PID, the buffers are toggled so that data is now being loaded into primary packet buffer 122. In the ideal case where the buffers can be switched as a result of the receipt of a packet with the shadow PID instantaneously with no disruption of receipt of packets having primary PIDs, the incoming data stream will have had the packet with the shadow PID situated between primary packets N and N+1 as shown in FIG. 6.

In this illustration, shadow packet 130 is situated between primary packet N 134 and primary packet N+1 138. The system headend can theoretically operate in any of three ways. Either the headend can always insert the shadow packet after its corresponding primary packet, before its corresponding primary packet or some combination thereof. (The term "corresponding" as used in this context is intended to mean packets that originated from the same packet of information. In this example, one packet is encrypted under a first encryption technique and the other is encrypted under a second encryption technique. One is assigned a primary PID and one is assigned a shadow PID. They are corresponding in that they ultimately carry the same payload once unencrypted.)

Once the buffers are toggled, in this ideal scenario, since the desired corresponding packet is situated adjacent the shadow packet 130, it is known that the corresponding packet is one of the packets 134 and 138. In the case where the shadow packet always precedes its corresponding primary packet, the corresponding primary packet is the first stored in the currently active (buffer 122 the example shown in FIG. 5). In the case of the shadow packet always following its corresponding primary packet, the corresponding primary packet is always the last packet stored in the inactive buffer (buffer 120 in the example shown in FIG. 5). When it is unknown whether the shadow packet follows or precedes its corresponding primary packet, the determination is still easily made by inspecting at most the first packet in the active buffer and the last packet in the inactive buffer. Thus, in this embodiment, searching an entire buffer or other large quantity of data for a corresponding packet is reduced to searching at most one or two packets. The packets can be confirmed as being corresponding packets in a number of ways, for example, corresponding packets may have the same packet sequence number, and the corresponding packets are both flagged as encrypted.

In some cases the software might not be able to change the DMA control registers without danger of a race condition. This can be addressed using an equivalent technique of logging the state of the DMA control registers when the shadow packet interrupt occurs. When the primary buffer is filled, the logged data can be used to find the location of the primary packet corresponding to the shadow packet.

Thus, a method of constructing a stream of data packets having primary and shadow packet identifiers (PIDs), the packets having headers and payloads consistent with certain embodiments of this invention includes receiving an incoming data stream having packets with the primary and shadow PIDs; providing a stream of packets having the primary PID to a first buffer; detecting a packet having the shadow PID and a shadow payload in the incoming data stream; switching the stream of packets having the primary PID to a second buffer in response to the detecting; and searching a first packet stored in the second buffer and a last packet stored in the first buffer for a packet corresponding to the packet having the shadow PID.

Once a pair of corresponding packets are identified, the data stream belonging to a particular program can be reconstituted. This is ultimately done by creating a stream of unencrypted packets with the same PID. Thus, the corresponding primary packet can be modified by swapping the payload from the secondary packet into the corresponding primary packet, or by swapping the PID of the shadow packet to the primary PID and inserting it into the data stream. This selectively encrypted data stream can then be decrypted (where required) and decoded at 160 to produce a decoded digital television program (or other content).

Figure 7:
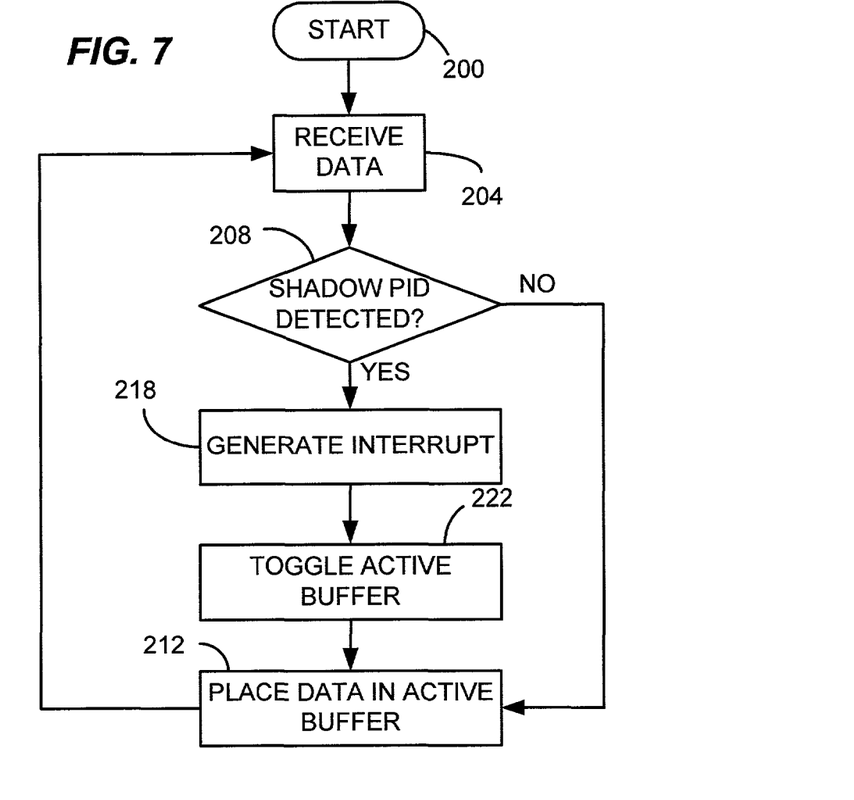
FIG. 7 is a flow chart of the data buffering and interrupt generation consistent with certain embodiments of the present invention.

The above process of buffering data and interrupt generation is shown in the flow chart of FIG. 7 starting at 200. As new data are received at 204, the data packets are inspected to determine if they have the shadow PID (i.e., to determine if a shadow packet has been received) at 208. If not, and the packet is a primary packet, the primary packet is placed in which ever primary data packet buffer is currently active (120 or 122) at 212. However, if a shadow PID is detected at 208, an interrupt is generated at the demultiplexer at 218. This interrupt causes the active and inactive primary packet buffers to toggle at 222 (changing the inactive buffer to active and vice versa). Newly received primary packets are then placed in the active buffer at 212. Data in the just closed buffer is passed to the consuming device.

Figure 8:
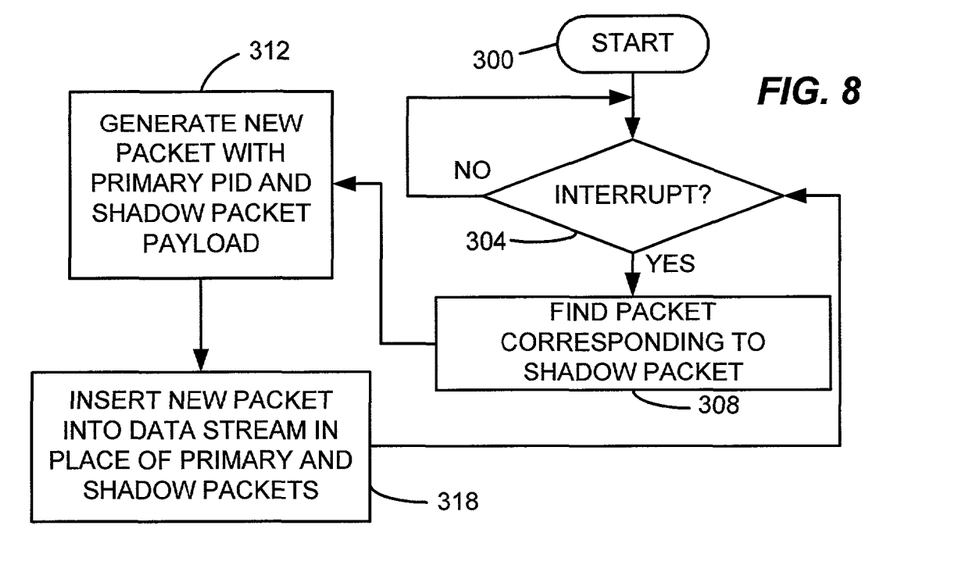
FIG. 8 is a flow chart illustrating finding corresponding packets and reconstitution of a program data stream in accordance with certain embodiments of the present invention.

FIG. 8 depicts the packet processing to reconstitute the program's data stream starting at 300. At 304, if no interrupt is detected, the process awaits receipt of the next interrupt. If an interrupt is detected, control passes to 308 where the packet corresponding to the shadow packet is located. As previously stated, the associated primary packet can be located either at the beginning of the active buffer or the end of the inactive buffer depending upon the way the system headend arranges outgoing packets. In other embodiments, a DMA register can be read at the time of the interrupt and this information used to pinpoint the location within the primary buffers that defines a location where the shadow packet resided within the original incoming data stream with respect to the primary packets. The search for the corresponding packets can then be limited to one or two packets before or after this point.

Specifying Packets to Process

Once the packet corresponding to the shadow packet is located, a new packet is generated at 312 with the primary PID and the shadow packet's payload. The new packet is then inserted in place of the shadow packet's corresponding packet in the program data stream at 318. Control then returns to 304 to await the next interrupt.

Thus, a method and apparatus for reconstituting packetized data streams representing a television program when the program uses multiple packet identifiers (PID) as in selective encryption schemes is provided. Transmission of multiple sets of system information (SI) is avoided by incorporating a lookup table within a private data packet. This is accomplished at the headend by constructing a program association table (PAT) that associates programs with primary PIDs and constructing a plurality of program map tables (PMT), one for each program in the PAT. A lookup table is constructed to map at least one primary PID to at least one shadow PID and the PAT, the PMTs and the lookup table are then broadcast over the content delivery medium. The PAT and lookup table are then used in the STB to program PID filters and demultiplexers to handle both primary and shadow PIDs.

Software Method to Process PID Pairs

A dual buffer arrangement in the set-top box provides ease of reconstitution of a data stream by generation of an interrupt upon receipt of a packet with a shadow PID. The buffers are toggled as a result of the interrupt and a corresponding packet can be found either at the beginning of the newly active buffer or the end of the inactive buffer. The stream of packets representing a program can then be reconstituted by creation of a new packet having the primary PID and shadow packet's payload.

While this invention has been described in terms of a cable television system and set-top boxes, equivalent satellite systems and television receivers that directly decode digital television are also contemplated and do not depart from this invention.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, bubble memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of providing multiple packet identifier (PID) information for a multiple carriage television content delivery system, comprising:
    constructing a program association table (PAT) that associates programs with primary PIDs;
    constructing a plurality of program map tables (PMT), one for each program in the PAT;
    constructing a lookup table that maps at least one primary PID that identifies a portion of a program encrypted under a first encryption system to at least one shadow PID that identifies a duplicate of the same portion of the program encrypted under a second encryption system; and
    at a television transmitter device, broadcasting the PAT, the PMTs and the lookup table over the television content delivery system.

2. The method according to claim 1, wherein the lookup table is broadcast as one or more MPEG user private data packets.

3. The method according to claim 1, carried out at a cable television system headend.

4. A method of demultiplexing a data stream having multiple packet identifiers for a program carried out at a television receiver device, comprising:
    at the television receiver device:
    receiving a program association table (PAT) that associates programs with primary PIDs;
    receiving a program map table (PMT);
    receiving a lookup table relating primary PIDs to shadow PIDs;
    determining, from the PMT and the lookup table that a program is associated with both a primary PID that identifies a portion of the program encrypted under a first encryption system and a shadow PID that identifies a duplicate of the same portion of the program encrypted under a second encryption system; and
    setting a PID filter to permit passage of packets having both primary and shadow PIDs.

5. The method according to claim 4, further comprising establishing a demultiplexer output path for both the primary PID and the shadow PID.

6. The method according to claim 4, wherein the lookup table contains a shadow PID for a shadow entitlement control message (ECM), and further comprising initializing a decrypter using the shadow ECM.

7. The method according to claim 4, carried out in a television set-top box.

8. A method of constructing a stream audio/video of data packets having related primary and shadow packet identifiers (PIDs), the packets having headers and payloads, comprising:
    at an audio/video receiver device:
    receiving an incoming audio/video data stream having packets with the related primary and shadow PIDs, where the related primary and shadow PIDs each identify duplicated portions of an audio/video program where one of the duplicated portions is encrypted under a first encryption system and another of the duplicated portions is encrypted under a second encryption system, respectively;

providing a stream of packets having the primary PID to a first buffer;

detecting a packet having the shadow PID and a shadow payload in the incoming data stream;

switching the stream of packets having the primary PID to a second buffer in response to the detecting; and searching a last packet stored in the first buffer for a packet corresponding to the packet having the shadow PID.

9. The method according to claim 8, further comprising generating an interrupt as a result of detecting the packet having the shadow PID.

10. The method according to claim 9, wherein the switching is carried out in response to the interrupt.

11. The method according to claim 8, further comprising generating a packet having the primary PID and the shadow payload.

12. The method according to claim 11, wherein the generating comprises substituting the primary PID for the shadow PID into the packet having the shadow PID.

13. The method according to claim 11, wherein the generating comprises substituting the shadow payload into the matching packet.

14. The method according to claim 8, wherein the corresponding packets have the matching sequence number.

15. The method according to claim 8, wherein the corresponding packets are encrypted under two different encryption techniques.

16. A non-transitory electronic storage medium storing instructions which, when executed on a programmed processor, carry out a process according to claim 8.

17. A method of constructing a stream of digital television data packets having related primary and shadow packet identifiers (PIDs), the packets having headers and payloads, comprising:

at a digital television receiver device:

receiving an incoming digital television data stream having packets with the related primary and shadow PIDs, where the related primary and shadow PIDs each identify duplicated portions of a program with one duplicated portion encrypted under a first encryption system and another duplicated portion encrypted under a second encryption system, respectively;

providing a stream of packets having the primary PID to a first buffer;

detecting a packet having the shadow PID and a shadow payload in the incoming data stream;

switching the stream of packets having the primary PID to a second buffer in response to the detecting; and searching a first packet stored in the second buffer for a packet corresponding to the packet having the shadow PID.

18. The method according to claim 17, further comprising generating an interrupt as a result of detecting the packet having the shadow PID.

19. The method according to claim 18, wherein the switching is carried out in response to the interrupt.

20. The method according to claim 17, further comprising generating a packet having the primary PID and the shadow payload.

21. The method according to claim 20, wherein the generating comprises substituting the primary PID for the shadow PID into the packet having the shadow PID.

22. The method according to claim 20, wherein the generating comprises substituting the shadow payload into the matching packet.

23. The method according to claim 17, wherein the corresponding packets have the matching sequence number.

24. The method according to claim 17, wherein the corresponding packets are encrypted under two different encryption techniques.

25. An electronic non-transitory storage medium storing instructions which, when executed on a programmed processor, carry out a process according to claim 17.

26. A method of constructing a stream of digital television data packets having related primary and shadow packet identifiers (PIDs), the packets having headers and payloads, comprising:

at a digital television receiver device:

receiving an incoming digital television data stream having packets with the related primary and shadow PIDs, where the related primary and shadow PIDs each identify duplicated portions of a program where one duplicated portion is encrypted under a first encryption system and another duplicated portion is encrypted under a second encryption system, respectively;

providing a stream of packets having the primary PID to a first buffer;

detecting a packet having the shadow PID and a shadow payload in the incoming data stream;

switching the stream of packets having the primary PID to a second buffer in response to the detecting; and searching a first packet stored in the second buffer and a last packet stored in the first buffer for a packet corresponding to the packet having the shadow PID.

27. The method according to claim 26, further comprising generating an interrupt as a result of detecting the packet having the shadow PID.

28. The method according to claim 27, wherein the switching is carried out in response to the interrupt.

29. The method according to claim 26, further comprising generating a packet having the primary PID and the shadow payload.

30. The method according to claim 29, wherein the generating comprises substituting the primary PID for the shadow PID into the packet having the shadow PID.

31. The method according to claim 29, wherein the generating comprises substituting the shadow payload into the matching packet.

32. The method according to claim 26, wherein the corresponding packets have the matching sequence number.

33. The method according to claim 26, wherein the corresponding packets are encrypted under two different encryption techniques.

34. An electronic non-transitory storage medium storing instructions which, when executed on a programmed processor, carry out a process according to claim 26.

35. A method of constructing a stream of digital television data packets having related primary and shadow packet identifiers (PIDs), the packets having headers and payloads, comprising:

at a digital television receiver device:
  receiving an incoming data stream having packets with the related primary and shadow PIDs, where the related primary and shadow PIDs each identify duplicated portions of a program where one duplicated portion is encrypted under a first encryption system and another duplicated portion is encrypted under a second encryption system, respectively;
  providing a stream of packets having the primary PID to a first buffer;
  detecting a packet having the shadow PID and a shadow payload in the incoming data stream;
  switching the stream of packets having the primary PID to a second buffer in response to the detecting;
  determining a memory address for a storage location in the first buffer at a time of the detecting; and
  searching for a packet stored at approximately the memory address in the first buffer for a packet corresponding to the packet having the shadow PID.

36. The method according to claim 35, further comprising generating an interrupt as a result of detecting the packet having the shadow PID.

37. The method according to claim 36, wherein the determining is carried out in response to the interrupt and wherein the determining comprises storing contents of a DMA register to note temporal location for packets.

38. The method according to claim 35, further comprising generating a packet having the primary PID and the shadow payload.

39. The method according to claim 38, wherein the generating comprises substituting the primary PID for the shadow PID into the packet having the shadow PID.

40. The method according to claim 38, wherein the generating comprises substituting the shadow payload into the matching packet.

41. The method according to claim 35, wherein the corresponding packets have the matching sequence number.

42. The method according to claim 35, wherein the corresponding packets are encrypted under two different encryption techniques.

43. An electronic non-transitory storage medium storing instructions which, when executed on a programmed processor, carry out a process according to claim 35.

44. A digital television receiver apparatus that reconstitutes/reconstructs a stream of data packets having related primary and shadow packet identifiers (PIDs), the packets having headers and payloads, the receiver comprising:
  a micro computer;
  a first primary packet buffer;
  a second primary packet buffer;
  a demultiplexer receiving an incoming data stream having packets with the related primary and shadow PIDs, where the related primary and shadow PIDs each identify duplicated portions of a program where one duplicated portion is encrypted under a first encryption system and another duplicated portion is encrypted under a second encryption system, respectively, and providing a stream of packets having the primary PID to one of the toggled primary packet buffers;
  means for detecting a packet having the shadow PID and a shadow payload in the incoming data stream;
  an interrupt handler that generates an interrupt as a result of detecting the packet having the shadow PID;
  means for toggling the stream of packets having the primary PID to the other of the first and second primary packet buffers in response to the interrupt; and
  program means running on the microcomputer for identifying a location of a packet adjacent the detected packet at least one of the first and second primary packet buffers.

45. The apparatus according to claim 44, further comprising program means running on the micro computer for generating a packet having the primary PID and the shadow payload.

46. The apparatus according to claim 45, wherein the generating comprises substituting the primary PID for the shadow PID into the packet having the shadow PID.

47. The apparatus according to claim 45, wherein the generating comprises substituting the shadow payload into the matching packet.

48. The apparatus according to claim 44 wherein the corresponding packets have the matching sequence number.

49. The apparatus according to claim 44, wherein the corresponding packets are encrypted under two different encryption techniques.

50. The apparatus according to claim 44, wherein the program means comprises means for reading a DMA register.

51. The apparatus according to claim 44, wherein the digital television receiver device comprises a television set-top box.

* * * * *